United States Patent [19]

Myers et al.

[11] Patent Number: 4,848,687

[45] Date of Patent: Jul. 18, 1989

[54] METHODS OF TAKING UP OPTICAL FIBER

[75] Inventors: Daryl L. Myers, Gwinnett County; James G. Wright, Jr., Fulton County, both of Ga.

[73] Assignee: American Telephone and Telegraph Company, AT&T Technologies, Inc., Berkeley Heights, N.J.

[21] Appl. No.: 208,196

[22] Filed: Jun. 17, 1988

Related U.S. Application Data

[63] Continuation of Ser. No. 938,657, Dec. 5, 1986, Pat. No. 4,798,346.

[51] Int. Cl.⁴ .......................................... B65H 67/056
[52] U.S. Cl. ............................ 242/18 A; 242/18 PW; 242/25 A
[58] Field of Search ............. 242/18 A, 18 PW, 18 R, 242/25 A, 25 R, 125.1, 35.5 R

[56] References Cited

U.S. PATENT DOCUMENTS

| | | | |
|---|---|---|---|
| 2,424,021 | 7/1947 | Cook | 242/25 A |
| 2,779,545 | 1/1957 | Hauck et al. | 242/25 A |
| 2,893,652 | 7/1959 | Davis | 242/25 A |
| 2,930,537 | 3/1960 | Davis et al. | 242/25 A |
| 3,080,128 | 3/1963 | Hauer | 242/25 A |
| 3,082,967 | 3/1963 | Hyprath et al. | 242/25 A |
| 3,368,765 | 2/1968 | O'Grady | 242/25 A |
| 3,441,229 | 4/1969 | Henrich | 242/25 A |
| 3,596,844 | 8/1971 | Engmann | 242/25 A |
| 3,620,482 | 11/1971 | Bravin | 242/25 A |
| 4,015,785 | 4/1977 | Ikegami et al. | 242/25 A |
| 4,138,069 | 2/1979 | Bonzo et al. | 242/18 A |
| 4,184,653 | 1/1980 | Bonzo | 242/18 PW X |
| 4,195,791 | 4/1980 | Frazee, Jr. | 242/45 |
| 4,291,841 | 9/1981 | Dalrymple et al. | 242/18 A |
| 4,545,542 | 10/1985 | Frazee, Jr. et al. | 242/18 A |
| 4,617,791 | 10/1986 | Louisberg . | |

FOREIGN PATENT DOCUMENTS

| | | | |
|---|---|---|---|
| 0948298 | 5/1962 | United Kingdom . | |
| 1091167 | 4/1965 | United Kingdom . | |
| 1309733 | 3/1973 | United Kingdom | 242/25 A |

Primary Examiner—Stanley N. Gilreath
Attorney, Agent, or Firm—Edward W. Somers

[57] ABSTRACT

Methods of and apparatus for winding strand such as optical fibers on alternate spools and for storing and protecting from damage coiled end portions of the strand to be wound on the spools in which the coils are clamped laterally of the coils with forces applied parallel to the axis of the coils. The methods and apparatus of the invention may be used for urging portions of the strand being fed to the spools and associated strand storage and clamping devices against the peripheral surfaces thereof to aid in the transfer of the distribution of the strand from one spool to the other spool.

2 Claims, 7 Drawing Sheets

Fig_5

Fig_6

METHODS OF TAKING UP OPTICAL FIBER

This is a continuation of application Ser. No. 938,657 filed Dec. 5, 1986, now U.S. Pat. No. 4,798,346.

TECHNICAL FIELD

The methods of this invention are particularly useful for taking up drawn optical or lightguide fiber and, more particularly, to the uninterrupted take up of extremely fine and fragile optical or lightguide fiber which is drawn from a vertically suspened preform.

BACKGROUND OF THE INVENTION

Not since microwave radio has there been as significant a technology developed in telecommunications as lightwave technology which is manifested in the use of lightguide fiber. Optical or lightguide fibers are inherently versatile as a transmission medium, all forms of information, be it voice, video or data, can be carried on a lightguide fiber. Also, lightwave systems are ideally suited to the high bandwidth requirement of digital transmission and hence are well-matched to the evolving transmission network in this country.

The most popular medium for lightwave transmission is glass, a solid whose structure is amorphous or random, as opposed to the crystalline structure that normally results when molten materials solidify. Fibers for lightwave communications are drawn from a preform which includes an elongated cylinder of glass having an inner core and an outer cladding with the thickness of the core and the cladding being in the same ratio in the fiber as they are in the preform. A drawing system is well-described in an article by D. H. Smithgall and D. L. Myers in the winter 1980 issue of the *Western Electric Engineer* and in Dalrymple, et al. U.S. Pat. No. 4,291,841 both of which are made a part hereof.

In the drawing system, the preform is fed into a heated region where it is necked down to the fiber size as the fiber is pulled from the heat zone. The diameter is measured at a point shortly after the fiber is formed, and this measured value is input to a control system. Within the controller, the measured fiber diameter is compared to a desired value and an output signal is generated to adjust the draw speed such that the fiber diameter approaches the desired value. After the fiber diameter is measured, one or more protective coatings are applied and the material forming the protective coatings is cured on the fiber.

The drawn fiber is taken up on plastic spools in such a manner that end portions of the fiber on each spool are available for testing. The spools of drawn, tested fiber are subsequently used to supply ribbon and/or cabling processes and apparatus.

The winding parameters during takeup must be carefully controlled, and collection of the fiber at low tension is necessary in order to minimize damage to the fiber or the coating thereon and to reduce the effect of microbending and macrobending losses on the transmission media. Therefore, the winding tension is minimized and the distribution of fiber across a spool is controlled to provide a desired profile of the package and facilitate unwinding at a subsequent operation.

In the control of the fiber tension, the fiber is allowed to form a catenary between the capstan and the take-up. As the spool fills, the catenary tends to decrease in length and it becomes necessary to decrease the take-up motor speed under controlled conditions. This is accomplished with an electro-optical system including a closed circuit television camera which detects any change in the height of the fiber catenary and causes changes in the take-up motor speed. This arrangement is described in commonly assigned application Ser. No. 040,026 filed on May 18, 1979 in the name of R. E. Frazee, Jr., now U.S. Pat. No. 4,195,791.

In addition to the problem of correlating the rotation of the takeup spool, a problem has been the uninterrupted takeup of all the fiber that can be drawn from a preform. Since the spools currently in use will each hold only a fraction of the total product output of a single preform, a cutover between spools must be accomplished, which introduces additional handling of the fiber.

Widespread use of lightguide fiber cables requires that economies must be introduced into the present manufacturing processes. It is desirable, for example, that the drawing of a preform and its takeup be accomplished in the shortest time possible so that all the fiber drawn from a single preform is taken up without interruption and with a minimum of handling.

Further, the manufacture of lightguide fiber requires the use of sophisticated, testing procedures at each step in order to insure a lightguide fiber of the highest quality. In order to accomplish that, it is necessary that the end of the lightguide fiber which initially engages a spool, as well as the final end portion on a spool, be accessible so that test apparatus can be connected thereto testing procedures.

While the prior art is replete with patents that disclose takeups particularly for copper based conductors, there is no known takeup which is ideally suited for taking up lightguide fiber at relatively high velocities. Such a system must include provisions for accessing an inner end of the lightguide package and must provide for continuous uninterrupted takeup while being capable of being controlled to avoid undue stressing of the lightguide fiber as it is taken up.

In the prior art, Bonzo, et al. U.S. Pat. No. 4,138,069 shows a tangential cutover type of takeup apparatus for glass optical filaments in which a plurality of spools are mounted rotatably on parallel axes projecting from a turret so that as one spool is wound full, it is moved out of a takeup position, the filament is attached to an empty spool which is moved into the takeup position, and the filament is severed from the full spool. Each of the spools is constructed with one flange having a rubber extension which includes two humps with a rubber O-ring disposed between the humps. Since a roller is used to depress a hump away from the O-ring to form a gap into which the filament falls and is gripped when the roller is disengaged, the timing during cutover is critical in order to form the gap and input the filament. The prior art also includes U.S. Pat. No. 2,893,652 which shows a common axis takeup arrangement in which a flange of a spool includes a generally V-shaped groove and one or more angularly spaced detents on the flange to catch wound stock if some should escape from the groove and tend to unwind. In another common axis arrangement, a spool flange is provided with a groove in the flange which extends across a chord of the flange tangent to the spool hub and into which groove a length of wire extending from a snagger at cutover is forced. Because of the impact than a snagger has on an elongated material being taken up at cutover, the use of a snagger to capture drawn lightguide fiber is not preferred.

What is needed is a drawn lightguide fiber takeup apparatus which is specially suited to the handling of this kind of material without abuse, which is uncomplicated and which provides a takeup package in which the leading and trailing ends of the fiber on a spool is accessible for testing. The accessible leading and trailing ends must be confined so that they will not whip about the spool during takeup causing damage to them or the other convolutions.

SUMMARY OF THE INVENTION

The present invention is an improvement over the lightguide fiber takeup method and apparatus disclosed in the Dalrymple, et al. U.S. Pat. No. 4,291,841. The methods for taking up lightguide fiber embodying certain principles of the invention may includes the steps of supporting each of a first and second spool for rotation about an axis of rotation. The spool in a first takeup position is held in coaxial alignment with the spool in a second takeup position with each of the spools having a storage and clamping assembly secured thereto intermediate the spools in closely spaced relationship. The spools and associated assemblies in the takeup positions are caused to be rotated. A length of the lightguide fiber adjacent one flange of the one spool in said first takeup position is taken up in the associated fiber storage and clamping assembly and stored and clamped therein, after which a predetermined length of the fiber is distributed in a plurality of convolutions across the spool in the first takeup position. Then a length of the fiber is taken up in a fiber storage and clamping assembly adjacent to one flange of the spool in the second takeup position and stored and clamped therein. The lightguide fiber which extends between the spools in the takeup positions is severed and the first of the spools on which has been distributed said predetermined length of fiber in a plurality of convolutions is oscilated out of the first takeup position. At the same time, a predetermined length of the fiber is distributed across the spool in the second takeup position. The distribution traverse is controlled about a reference point to change the length of travel of a distributor on each side of the reference point to shape the package of lightguide fiber in a predetermined manner.

An apparatus for taking up lightguide fiber which is drawn from a preform embodying certain features of this invention may includes facilities for supporting each of a first and a second spool for rotation about a common axis. Facilities are provided for mounting each of the spools for oscilation about an axis which is parallel to the axes of rotation of the spools, with said axis of rotation of each of said spools being an equal distance from the axes of oscilation, and facilities for holding one of said spools in a first takeup position in coaxial alignment with a spool in a second takeup position. Means are rendered effective by a spool being in one of the takeup positions for rotating said spool in said takeup position and means are mounted for reciprocal movement along a path of travel which is parallel to and spaced from the colinear axes of rotation of the spools in the first and the second takeup positions for distributing lightguide fiber on one of the spools in one of said takeup position. A relatively short length of lightguide fiber is caused to be taken up on a storage and clamping assembly which is attached to one of the spools in one of the takeup position adjacent a centerline of the apparatus and then a plurality of convolutions of lightguide fiber are distributed on the spool in the one position. In response to the takeup of a predetermined length of fiber on the spool in the one position, the distribution of the fiber is indexed to the storage and clamping assembly which is connected to the spool in the other takeup position and a relatively short length of lightguide fiber is taken up thereon. Subsequently, a plurality of convolutions of fiber are distributed on the spool in the other position, The storage and clamping assemblies are positioned closely adjacent to each other with a portion of the fiber extending therebetween. This portion of the fiber is then severed so that the fiber which has been taken up on the spool in the one takeup position is separated from the relatively short length of fiber in the storage and clamping assembly of the spool in the other takeup position to provide an accessible begining end portion on the other spool, and the facilities are responsive to the separation of the fiber for oscilating said first spool out of the takeup position to permit removal of the full spool and replacing it with an empty spool to permit a new empty spool to be moved into the winding position and permit the sequence of operation to be repeated.

BRIEF DESCRIPTION OF DRAWINGS

Other features of the present invention will be more readily understood from the following detailed description of specific embodiments thereof when read in conjuction with the accompanying drawings, in which.

DETAILED DESCRIPTION

Figure 1:
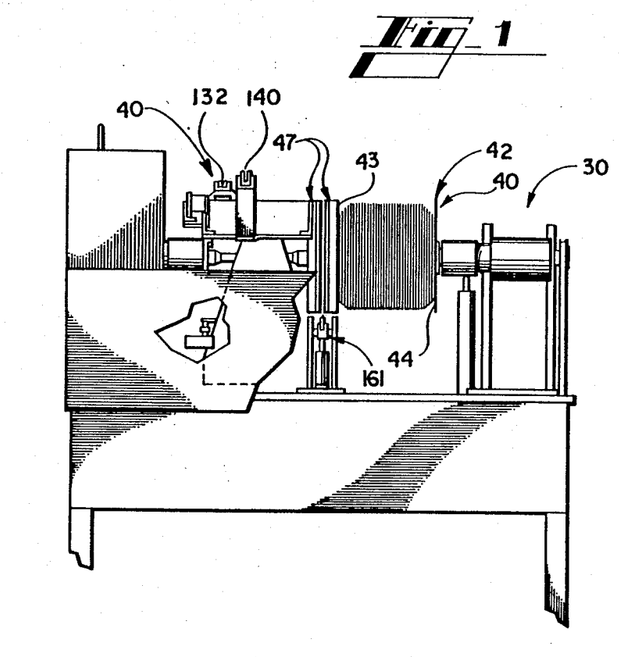
FIG. 1 is an overall elevational view of an apparatus of this invention for taking up lightguide fiber and showing two spool assemblies being aligned coaxially in the takeup position with portions broken away for purposes of clarity.
Figure 2:
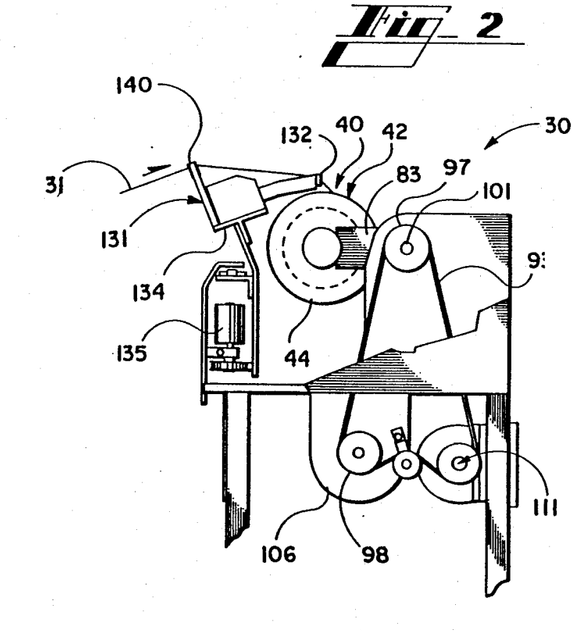
FIG. 2 is an elevational end view of the takeup apparatus of FIG. 1.

Referring now to FIGS. 1 and 2, there is shown a strand take-up apparatus, designated generally by the numeral 30, for taking up extremely fine and fragile lightguide fiber 31 being drawn from a preform (not shown). In a preferred embodiment of this invention shown in FIG. 1, the apparatus 30 is designed to support independently each of two spool assemblies 40—40 on each of which may be taken up a plurality of convolutions of the drawn lightguide fiber 31. The spool assemblies 40—40 are used alternately to take-up all of the fiber 31 which is drawn from one preform in a drawing apparatus (not shown) and through a catenary control system (not shown) which are described in the above-identified U.S. Pat. No. 4,195,791.

Referring now to various FIGS., it is seen that each of the spool assemblies 40—40 includes a replaceable takeup spool, designated generally by the numeral 42. The takeup spool 42 is made of a plastic material such as ABS and includes a pair of spaced flanges 43 and 44 which are connected together through a hub 46 (see FIGS. 9 and 11). The takeup spool 42 also includes a centrally disposed tube 49 which is connected to an inwardly facing surface of the hub 46 through a plurality of angularly spaced, radially extending ribs 48—48. In a preferred embodiment, the hub 46 and the flanges 43 and 44 are designed so that each of the spools 42—42 can accommodate at least 2500 meters of the drawn lightguide fiber 31.

In order to facilitate cutover between full and empty spools 42—42 and to provide access to the initial end portion of the fiber 31 on a takeup spool 42, each spool assembly 40 includes a storage and clamping assembly, designated generally by the numeral 47, (see FIG. 7) for storing and clamping a portion of the leading end of the fiber 31 to be wound on the spool 42 prior to winding the fiber 31 on the spool 42 during the cutover of the lightguide fiber 31 from a full one of the spools 42—42 to an empty one of the spools 42—42. The storage and clamping assembly 47 comprises a pair of circular side plates 51 and 52 which are made of suitable material. The plate 52 is mounted for selective lateral movements with respect to the plate 51 to provide approximately a 3/16 inch wide annular gap 60 (see FIG. 9) between resilient, annular rubber or neoprene facings 50—50 on the adjacent surfaces of the plates 51 and 52 and to permit the fiber 31 to be wrapped around a circular array of pins 53—53 secured to the plate 52 and projecting through relatively large apertures 54—54 in the plate 51.

Figure 7:
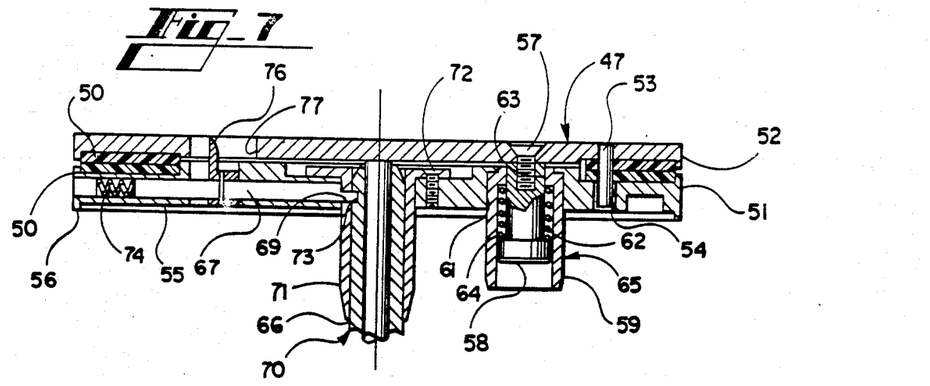
FIGS. 7 and 8 are enlarged, detailed cross sectional and end views of one of the storgae and clamping assemblies used in FIG. 1., FIG. 7 being a section view of the assembly along lines 7—7 of FIG. 8 looking in the direction of the arrows.
Figure 8:
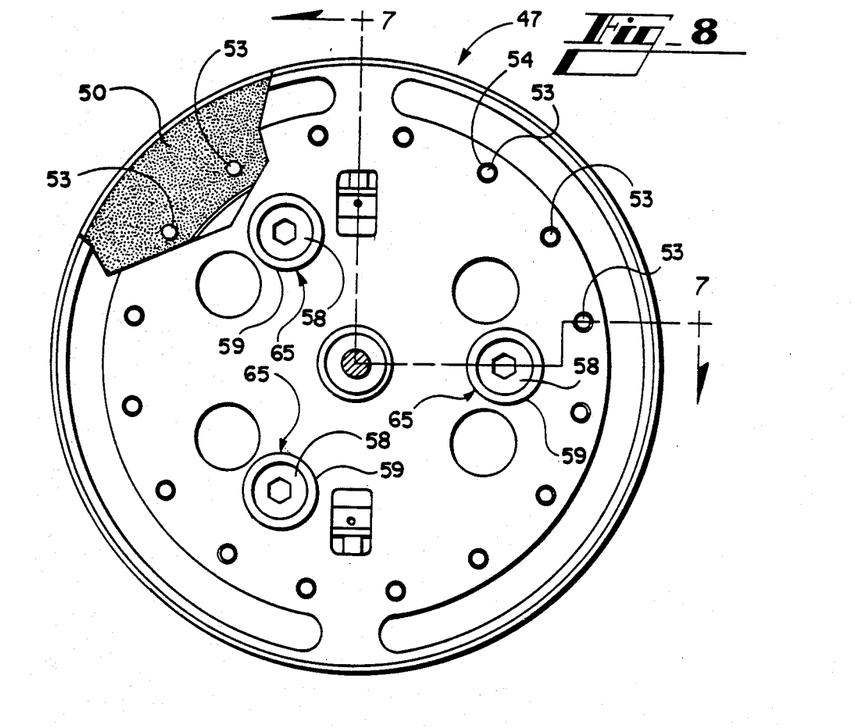

The inside plate 51 has a circular indentation 55 facing the flange 43 of the associated spool 42 and forming a collar 56 which overhangs the flange 43 of the spool 42 inserted therein to prevent the portion of the fiber 31 being transferred from one spool 42 to the other from inadvertently entering any existing clearance gap between the flange 43 of the take-up spool 42 and the adjacent plate 51 of the storage and clamping assembly 47. The plates 51 and 52 are held together by screws 57—57 and enlarged nuts 58—58 secured to the plate 51, the enlarged nuts 58—58 being mounted slidably in sleeves 59—59. The sleeves 59—59 are positioned in stepped apertures 61—61 in the plate 51 and urged toward the plate 51 by helical compressed springs 62—62 positioned between collars 63—63 in the sleeves 59—59 and collars 64—64 formed by enlarged heads on the enlarged nuts 58—58. The sleeves 59—59 are also used as dogs, designated generally by the numerals 65—65, to accept driving motion from the associated spool 42 and tranfer it to the associated storage and clamping assembly 47.

The storage and clamping assemblies 47—47 are sufficiently close to each other that when one of the assemblies 47—47 is open the movable plates 52—52 of the assemblies 47—47 are substantially in engagement with each other, therefore, the other assembly can not be opened. Further the adjacent faces of the plates 52—52 could be covered with material having a relatively high coifficient of friction and be caused to engage each other when either of the assemblies 47—47 are open thus transferring the driving force from the empty spool 42 to the full spool 42 through the engaged frictional facing on the plates 52—52.

The assembly 47 is secured removably to a hollow shaft 66 of an arbor or spindle, designated generally by the numeral 70 and described hereinafter in greater detail, by a pair of latches 67—67 urged normally through apertures 69—69 in a cone assembly 71 secured in the plate 51 by screws 72—72 and into an annular groove 73 in the hollow shaft 66 by helical compression springs 74—74. The latches 67—67 may be urged radially outwardly in the plate 51 by force being applied to finger tabs 76—76 thereof projecting transversely of the latches 67—67 through apertures 77—77 in the plate 52 at diametrically opposed portions thereof. The operators may grasp the assembly 47 with their fingers and use their thumbs the move the projecting tabs 76—76 of the latches 67—67 radially outwardly, from their normal locked position, and remove the assembly 47 from the hollow shaft 66 axially thereof.

In preparing the apparatus 30 for takeup of the lightguide fiber 31 from a preform (not shown), an operator removes the storage and clamping assembly 47 by pushing the latches 67—67 apart outwardly by applying force against the projecting tabs 76—76 and the placing the spool 42 onto the spindle 70. The spool assembly 40 is oriented so that a truncated cone portion 81 (see FIG. 9) of a hub, designated generally by the numeral 82, keyed to the hollow shaft 66 by a radially projecting key 87, enters the tube 49 of the takeup spool 42 and a dog 80 on a flange 85 of the hub 82 projects between the ribs 48—48. With the latches 67—67 urged outwardly, the dogs 65—65 are positioned between the ribs 48—48 and the cone assembly 71 is inverted in the tube 49. The plate 51 of the assembly 47 is urged against the flange 43 of the spool 42 to push the spool 42 in place with the flange 44 thereof against the flange 85 of the hub 82 and the latches 67—67 are released into the annular groove 73 to lock the assembly 47 in place. This sequence of steps is repeated to place each of the spools 42—42 onto each of the associated arbors 70—70 in each of the spool assemblies 40—40. The rotary motion of the spool 42 is transmitted to the storage and clamping assembly 47 by the radially extending ribs 48—48 (FIG. 9), between which the dogs 65—65 project when the takeup spool 42 is in place in the spool assembly 40, being forced against the dogs 65—65.

Figure 9:
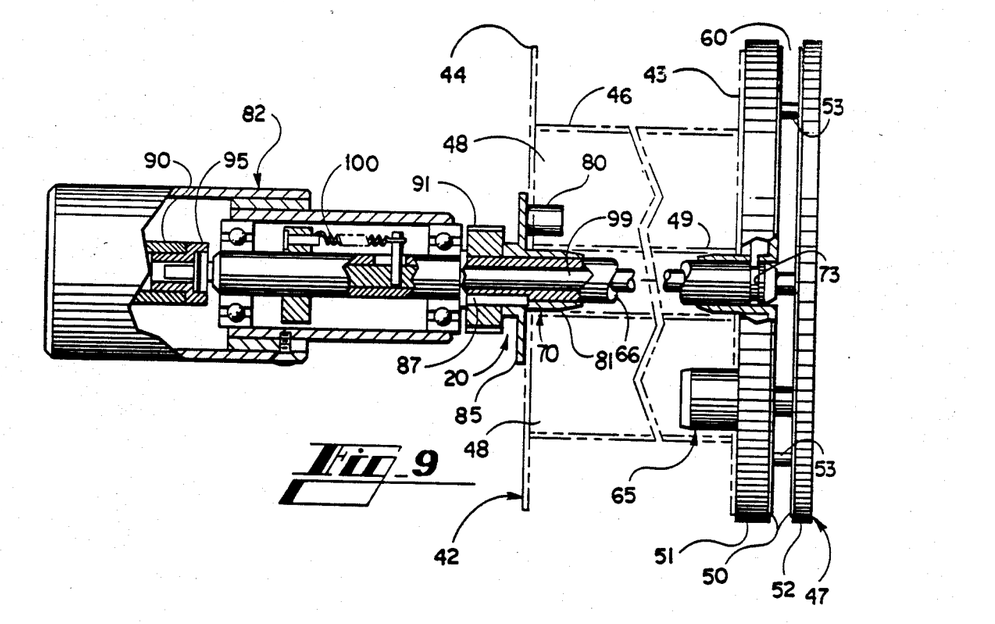
FIG. 9 is an enlarged elevational view, partially in section, of one of the spool assemblies in which the associated storage and clamping assembly is opened to receive the fiber during cutover.

An air cylinder 90 in the hub 82 of the spindle 70 is actuated to move a piston 95 in the end thereof which forces a center rod 99 positioned in the hollow shaft 66 against the action of a tension spring 100 and against the action of the springs 62—62 in the assembly 47 to move the movable plate 52 of the storage and clamping assembly 47 away from the plate 51 to open up the assembly 47.

Figure 3:
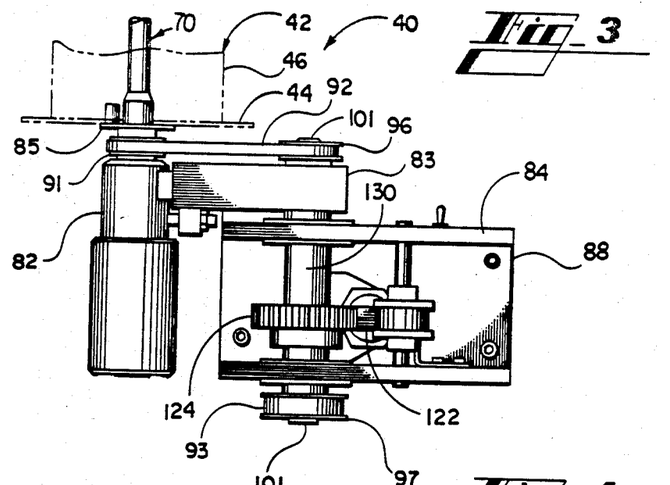
FIG. 3 is an enlarged plan view of one of the spool assemblies which comprises the takeup spool in the winding position.
Figure 4:
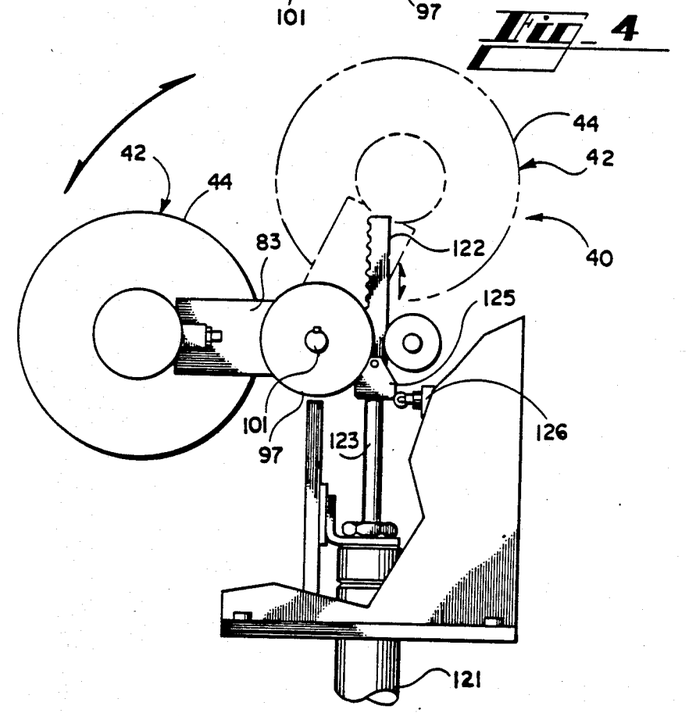
FIG. 4 is an elevational view of the spool assembly of FIG. 3 shown an alternative winding and unloading positions.

Turning now to FIGS. 3 and 4 it can be seen that each of the spools 42—42 is mounted for rotation on the winding arbor 70 which extends from one end of an arm 83 that is mounted in a frame 84 which is supported from a base 88.

It should be understood that while the preferred embodiment of the apparatus includes two spool assemblies 40—40 with the axes of rotation of the spools 42—42, during the winding cycle, being coaxial, that the invention is not so limited. It is obvious from the prior art that a single spool 42 on a singe spindle (not shown) could be utilized, or the spools 42—42 could be supported on turrets to provide a greater number of spool assemblies 40—40 or the axes of rotation of the spools 42—42 during the winding cycle could be parallel with each other as illustrated in the prior art.

Each spindle 70 has a tooth type pulley 91 attached thereto and is caused to be driven normally through belts 92 and 93 and pulleys 96, 97, and 98 (FIGS. 2, 3 and 10) and a shaft 101 by a primary drive motor 106 associated with each spool assembly 40. However, as explained herein below, the spindles 70—70 of the spool assemblies 40—40, even though being connected to and driven by the individual drive motors 106—106 associated therewith, are each driven selectively by the motor 106 associated with the spool assembly 40 on which the empty spool 42 is mounted through an air clutch 107 (FIG. 10) interconnected two sections 108—108 of a jack shaft, designated generally by the numeral 111, which extends through bearings 112—112 on a support 113, that is mounted on the frame.

Figure 10:
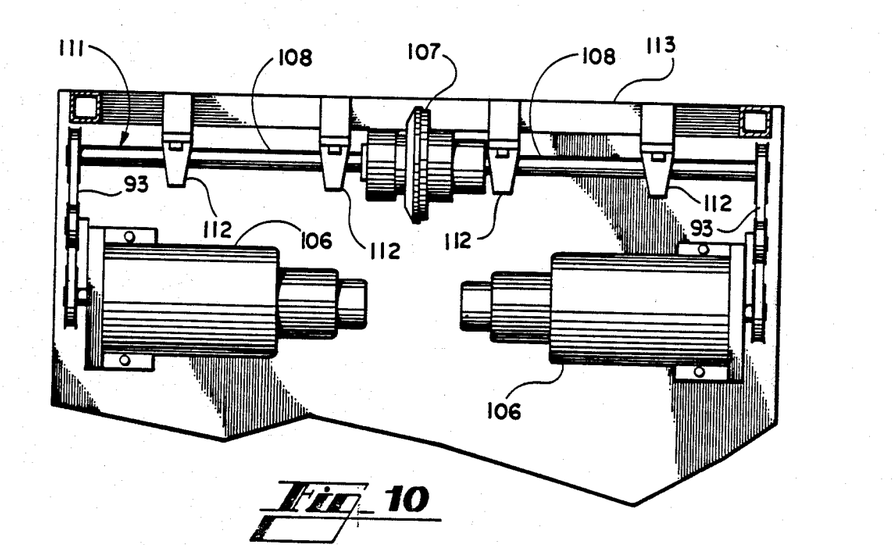
FIG. 10 is an enlarged bottom view of a portion of the apparatus in FIG. 1 showing a jack shaft with one of the drive means of the spool assemblies connected at each end thereof.

At the time the air clutch 107 is activated, the motor 106 associated with the full spool 42 is deenergized, which will allow the full spool 42 to be driven by the motor 106 associated with the empty spool 42, and since the motor 106 associated with the empty spool 42 is already energized to drive the associated spool assembly 40 at the desired angular velocity, and since the two drive systems are interconnected directly by the jack shaft 111, the full spool 42 is driven at the same angular velocity as the empty spool 42 by the motor 106 asoicated with the empty spool 42. When the clutch 107 is deactivated the full spool 42 can be allowed to coast to a stop or could be stopped instantaneously by using the associated motor 106 as a brake.

As explained previously, each spool assembly 40 is mounted for oscillation about the shaft 101 (see FIGS. 3 and 4) which is supported on the frame 48 which is mounted on the base 88. In the preferred embodiment, the spool assembly 40 is designed to be moved upwardly in one direction by the piston of the cylinder 121 through a rack 122 attached to the rod 123 of the piston 121 and a pinion 124 secured to a housing 130 through which the shaft 101 and in which the shaft 101 is mounted rotatably. This arrangement provides the capability of selectively positioning the spool assembly 40 in a winding position or an unloading position.

Once the spool assembly 40 has been indexed to move an empty spool 42 into one of the two side-by-side load positions, the empty spool 42 is driven in a rotary clockwise direction, as viewed in FIG. 2. The drive mode is automatic and is initiated when the spool assembly 40 is swung into a winding position by the movement of the gear rack 122 with respect to the pinion gear 124 causing a switch actuator 125 secured to the gear rack 122 to close a switch 126 to permit the associated drive motor 106 to be energized.

It should be observed that when a spool assembly 40 is in one of its takeup positions, it is rotated by the drive system that is connected to its associated motor 106, until an operator controls the apparatus 30 by depressing an appropriate pushbutton switch (not shown), to initiate a cutover operation, and thus initiates a sequence of events including actuation of the clutch 107 or until the clutch 107 is actuated automatically because a desired takeup length count has been achieved. At that time both spool assemblies 40—40 in the winding and takeup positions will be coupled together mechanically and therefore are rotated at the same angular velocity by the drive motor 106 associated with the spool assembly 40 supporting the empty spool 42 to which the distribution of the fiber 31 is about to be directed.

The distribution of the lightguide fiber 31 from the drawing operation is effected by a distributor, designated generally by the numeral 131 (FIGS. 2 and 11), which is mounted for reciprocal motion parallel to the axes of rotation of the spools 42—42 in the winding position on rods (not shown) by its own reversible drive motor 135. The distributor 131 includes fiber guides 132 and 140 which are mounted on a carriage 134 for reciprocation back and forth across the winding surface of the active spool 42 in the winding position. The movement of the carriage 134 is controlled by a logic circuit such as that disclosed in U.S. Pat. No. 4,291,841 or by some other system which is well known in the takeup art of strand material and which may be one shown for example in U.S. Pat. No. 3,408,013 issued Oct. 29, 1968 to L. P. Hauck, et al.

Figure 11:
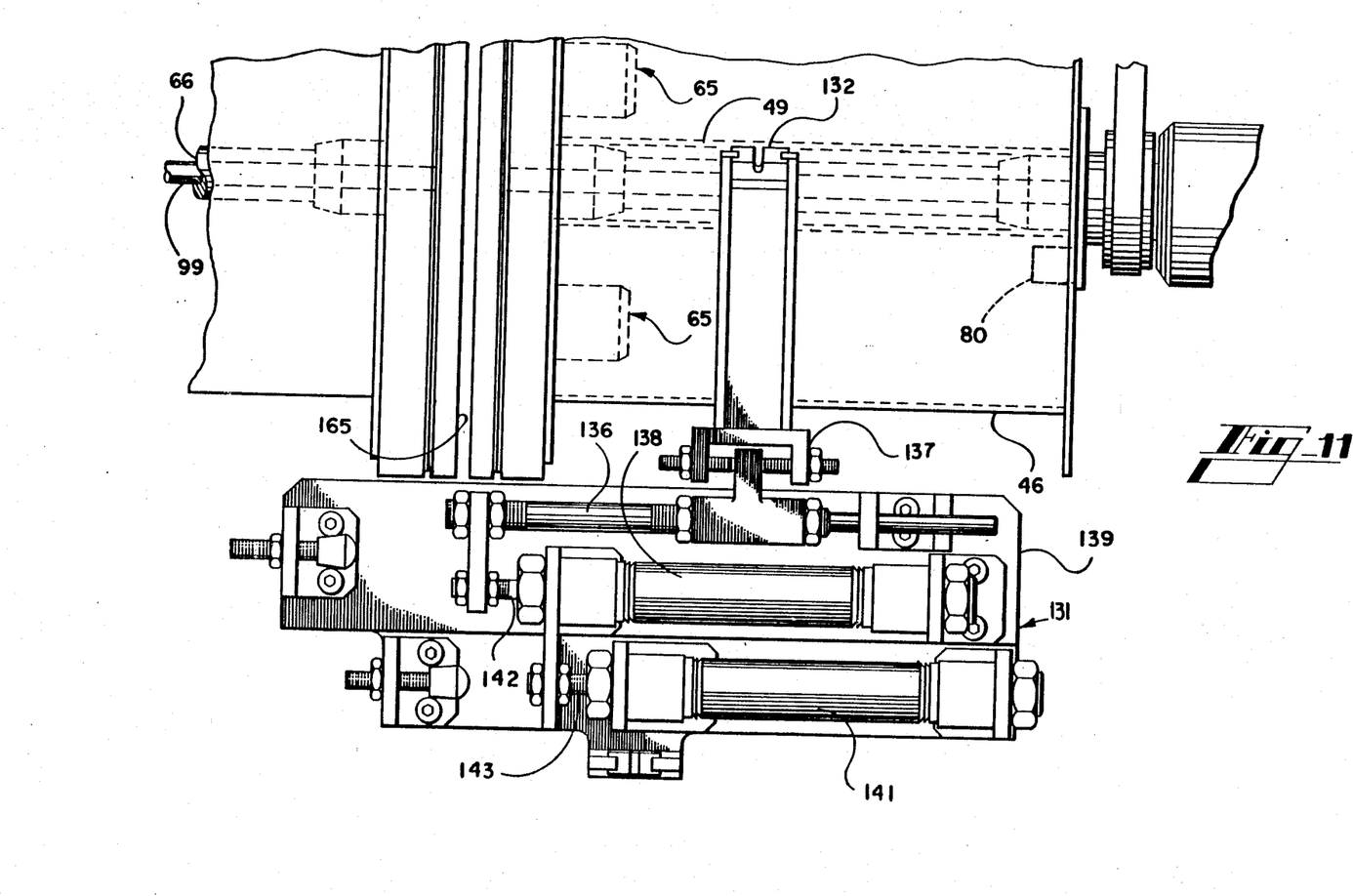
FIG. 11 is an enlarged view of portions of the apparatus of FIG. 1 showing the details of portions of the strand distribution mechanism.

The fiber guide 132 is mounted adjustably on the carriage 134 by a rod 136 through an adjustable mechanism 137 and is indexed selectively with respect to the carriage 134 by a double-action piston-cylinder assembly 138 and the portion 139 of the carriage 134 on which the assembly 138 is mounted with respect to the remaining portions of the carriage 134 by double action piston-cylinder assembly 141. In order to index the distributor guide 132 from the inside flange 43 of the active spool 42 to the open storage and clamping assembly 47 associated with the empty spool 42, the piston rod 142 of the assembly is activated in the appropriate direction, and when it is desirable to index the distributor guide 132 from the assembly 47 associated with the empty spool 42 to just inside the flange 43 of the empty spool 42, the rod 143 of the assembly 141 is activated in the appropriate direction.

In is desirable to provide means for urging the portions of the fiber 31 being fed to the spools 42—42 and the associated storage and clamping assemblies 47—47 against any of the peripheral surfaces of the spools 42—42 and storage and clamping assemblies 47—47 projecting outwardly from the rotational axis thereof beyond the winding surface of the then active spool 42 and the empty spool 42 positioned in the takeup positions as the distribution of the fiber 31 is being indexed from the then active spool 42 to the empty spool 42 to cause the fiber 31 to move transversely of planes perpendicular to the rotational axes of the spools 42—42 and along said peripheral surfaces to aid in the indexing of the distribution of the fiber 31 selectively from one portion of the winding apparatus 30 to another.

A belt 151 (FIG. 5), wide enough to span the two storage and clamping assemblies 47—47 and the adjacent flanges 43—43 of the spools 42—42, is mounted movably on a triple pulley assembly, designated generally by the numeral 152, mounted pivotaly about a pin and actuated from an operative position wherein the belt 151 is in engagement with the storage and clamping assemblies 47—47 to an inoperative position by a fluid cylinder 154. One of the pulleys 160 of the triple pulley assembly 153 is mounted on a spring-loaded arm 166 which is pivotable about a pin 167 and is normally urged outwardly to maintain a slight tension on the belt 151.

Figure 5:
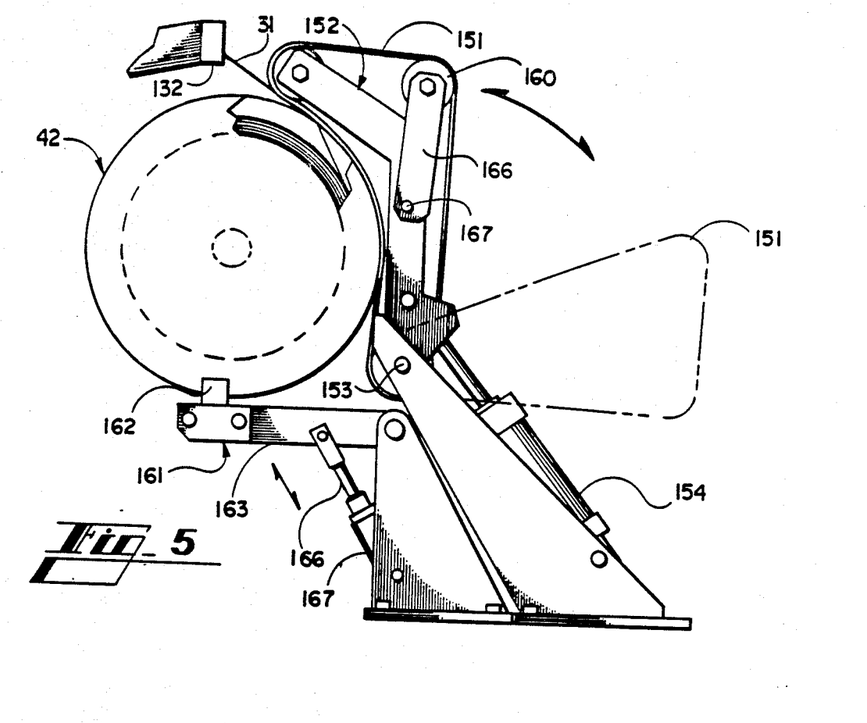
FIG. 5 is a detail elevational view of a portion of the apparatus of FIG. 1 showing a snubbing belt in alternative operating position during a cutover operation and inoperative position and a cutter in position to cut the fiber after the cutover operation.

During the cutover operation of the distribution of the fiber 31 from the active full spool 42, the belt 151 is used to lightly pinch the fiber 31 between the belt 151 and peripheral surfaces of the winding assemblies 40—40 to cause the fiber 31 to walk or be deflected or otherwise move over the portions of the apparatus which project outwardly from the winding surface of the winding assemblies 40—40 over any exposed surface of the flange of ajoining flange 43 of the full spool 42, move across the associated storage and clamping assembly 47 to the next open space, in the storage and clamping assembly 47 associated with the empty spool 42, wherein a new leading end of the fiber 31 is wound, and then move the fiber 31 from the storage and clamping assembly 47 associated with the empty spool 42 to the next open space which is the empty spool 42.

The belt 151 stays up against the storage and clamping assemblies 47—47 until all of the steps of the transfer of the distribution of the fiber 31 are completed. The belt 151 is then moved out of the way of the spooling position to permit removal of the full spool 42 and insertion of an empty spool 42.

Figure 12:
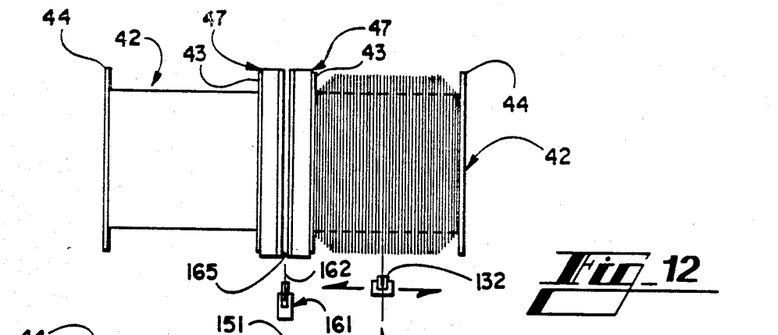
FIGS. 12 to 15, inclusive, are schematic views of the various positions and conditions of portions of the takeup apparatus of FIG. 1 during various phases of the cutover operation.

A cutter, designated generally by the numeral 161, is provided to sever the portion of fiber 31 extending between the full and empty spools 42—42 across a slot or gap 165 (see FIGS. 11, 12 and 15) between the two assemblies 47—47 which is created when the storage and clamping assembly 47 associated with the empty spool 42 is closed. The cutter 161 includes a blade 162 which faces the centerline between the two spool assemblies 40—40. The cutting blade 162 is mounted on a pivotable arm 163 so that it can be moved upwardly into the slot or gap 165 between the adjacent spool assemblies 40—40 to sever the portion of the lightguide fiber 31 extending therebetween. The cutting blade 162 is operatively connected to a rod 166 of a piston-cylinder assembly 167 and is operated in a predetermined sequence by the control system (not shown).

After the distribution of the lightguide fiber 31 has been completed on one of the takeup spools 42—42, and cutover has been made to the empty spool in the adjacent spool assembly 40, the cutter 161 is operated to move the cutter blade 162 upwardly into gap 165 and into the path of travel of the portion of the fiber 31 revolved by and extending between the two storage and clamping assemblies 47—47 to sever the lightguide fiber 31 midway between the adjacent spool assemblies 47—47.

A control system such as that disclosed in U.S. Pat. No. 4,291,841 could be used and any particular package profile desired on the takeup spool 42 could be achieved. The system could be adjusted so that the distribution count which is loaded into a register in a microprocessor (not shown) could be decremented selectively in order to taper the buildup of the lightguide fiber 31 on the hub 46 of the takeup spool 42 in a predetermined manner.

During distribution of the fiber 31 on the spool 42, a counter in the microprocessor (not shown) may be used in count the length of lightguide fiber 31 which is being taken up on a spool 42. A preset length count e.g. 2500 meters, which is called an achieved-length count is stored in the microprocessor. The draw capstan motor (not shown) and takeup system is provided with an encoder to facilitate the measurement of the length of fiber 31 that in wound on a given spool 42.

After a preselected length of the fiber 31 has been taken up on the spool assembly 40 in the then active takeup spool 42, the microprocessor automatically initiates a transfer of the distribution of the fiber 31 to the empty spool 42 in the other takeup position. However, in the start up of the apparatus 30, after the operator is satisfied that proper conditions exist for takeup, the operator depresses the transfer pushbutton switch (not shown) which causes cutover of the distribution of the fiber 31 from the spool 42 in the then active position to the storage and clamping assembly 47 associated with the empty spool 42 and then to the empty spool 42.

SEQUENCE OF OPERATION

When a signal, that the desired amount of fiber 31 has been taken up on the then active spool 42 (see FIG. 12), is received indicating that the transfer of the fiber takeup from the active spool 42 to the empty spool 42 is required, the air clutch 107 in the jack shaft 111, which couples the two spool drive motors 106—106 together, is actuated. This couples the two systems together mechanically and forces the two motors 106—106 and the associated spools 42—42 to rotate at exactly the same angular velocity. Failure to have both spools 42—42 rotating at the same angular velocity would result in either a loose loop of the fiber 31 being formed or a stressed fiber 31 and possibly a broken fiber 31 when the distribution of the fiber 31 moves from the then active spool 42 to the empty spool 42. The drive motor 106 associated with the empty spool 42 is already energized at this time so that acceleration of the empty spool 42 has already been accomplished at a reasonably slow rate to prevent damage to the take-up drive system and the motor 106 associated with the full spool 42 is de-energized.

Although electronic regulation of the drive motors 106—106 is very good so that the rotational velocity of the two spools 42—42, if driven separately, would be substantially the same, there is still a slight difference in the rotational velocity, and the use of the clutch 107 overcomes that difference so that the two spools 42—42 and associated storage and clamping assemblies 47—47 are definitely rotated at the same rotational velocity at the time of cutover.

Figure 13:
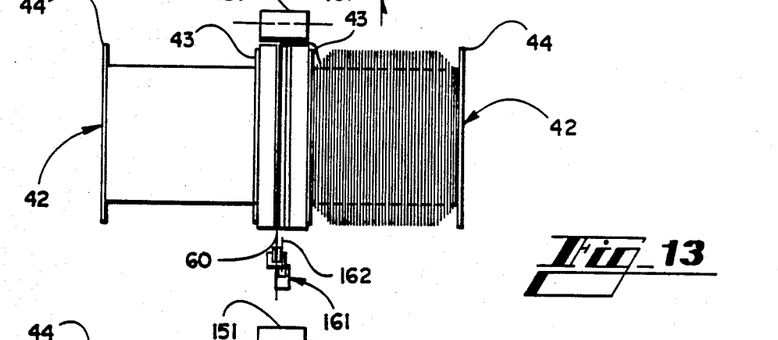
Figure 14:
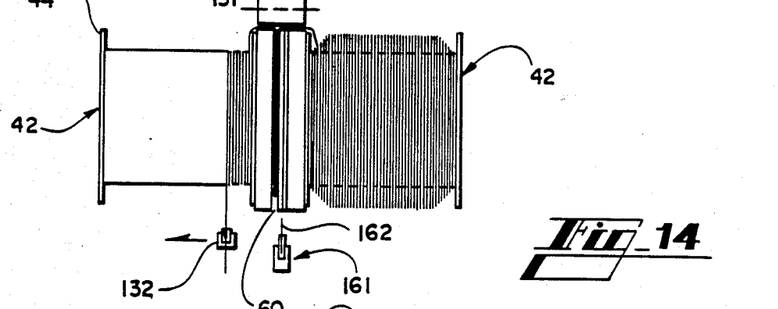

At this time the fiber storage and clamping assembly 47 associated with the empty spool 42, which is positioned axially concentric and tightly against the inside flange 43 of the associated spool 42, is actuated by the piston 95 which forces the center rod 99 of the spindle 70 against the movable plate 52 of the storage and clamping assembly 47. The movable plate 52 of the associated storage and clamping assembly 47 slides toward and against the movable plate 52 of the storage and clamping assembly 47 associated with the active spool 42 (FIG. 13). This movement creates the slot 60 between the two plates 51 and 52 of the storage and clamping assembly 47 associated with the empty spool 42 into which the inside end of the fiber 31, to be wound on the empty spool 42, will be placed. Also the gap 165 between the two storage and clamping assemblies 47—47 is now closed so there is a continuous surface between the active spool 42 and the slot 60 in the storage and clamping assembly 47 associated with the empty spool 42.

The transfer idler or nip belt 151 is moved into engagement with the assemblies 47—47 by actuation of the air cylinder 154, to move the upper guide roller of the assembly 152 to a position fairly near (about 1" away from) the fiber distributor guide 132 when the guide 132 is transferring the distribution of the fiber 31 from the active spool 42 to the empty spool 42 (FIG. 13). At this time the belt 42—42 straddles the adjacent flanges 43—43 of the two spools 42—42 and straddles and is in contact with adjacent surfaces of both of the storage and clamping assemblies 47—47 simultaneously. The rotating storage and clamping assemblies 47—47 cause the idler belt 151 to be driven thereby when in contact with the assemblies 47—47. The idler belt 151 is required to prevent any hesitation in the motion of the fiber 31 as the fiber 31 is moved from the active spool 42, over the spool flange 43 of the then active spool 42 and onto the storage and clamping assembly 47 associated with the empty spool 42.

The actual transfer of the distributor 131 during cut-over from the active spool 42 to the empty spool 42 is accomplished by actuating the distributor assembly cylinder 138 which rapidly moves the distributor fiber guide 132 from the inside flange 43 of the active spool 42 to a position in line with the slot 60 in the storage and clamping assembly 47 associated with the empty spool 42 (FIG. 13). Approximately five wraps of fiber 31 is then taken up in the slot 60 in the associated storage and clamping assembly 47, depending on the inside end length required for subsequent fiber testing.

Figure 6:
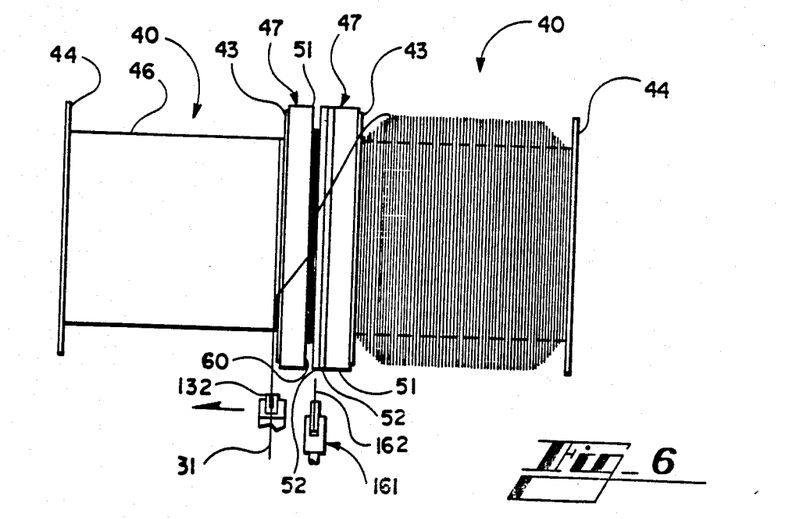
FIG. 6 is a front elevational view of the takeup apparatus showing the takeup of the fiber having been completed on one of the spools and fiber being taken up on the empty spool with the leading end of the fiber about to be clamped in the storage and clamping assembly associated with the empty spool.

The distributor assembly air cylinder 141 is then actuated to move the fiber guide 132 rapidly from its position at the slot 60 in the storage and clamping assembly 47 associated with the empty spool 42 to a position so that the fiber 31 will be fed to the inside flange 43 of the empty spool 42 (FIG. 6). Normal distribution of fiber 30 on the empty spool 42 then begins and the pistons in the distributor air cylinders 138 and 141 remain in the existing positions until the next cutover operation.

Figure 15:
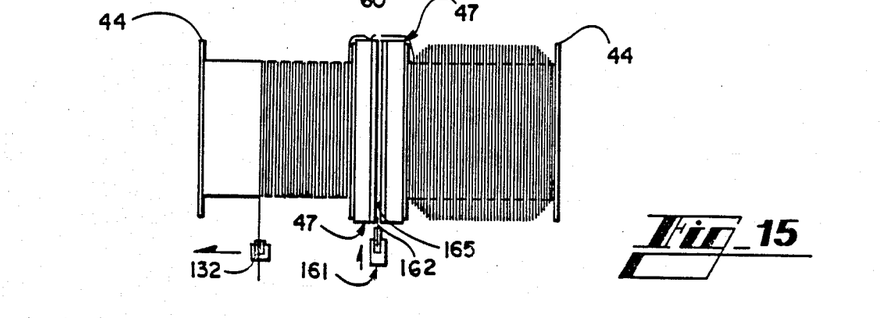

After the fiber transfer or cutover operation to the empty spool 42 is complete, the idler belt 151 is pivoted to its inactive position and the air cylinder 90 which opened the storage and clamping assembly 47 associated with the empty spool 42 is deactivated so that the springs 62—62 and 100 are allowed to return the plate 52 of the storage and clamping assembly 47 to its normal or inactive clamping position (FIG. 15). Accordingly, the spring loaded sliding plate 52 of the assembly 47 squeezes the fiber 31 in the slot 60 between the rubber or neoprene facings 50—50 of the sliding plate 52 and fixed plate 51 of the storage and clamping assembly 47. Since both the storage and clamping assemblies 47—47 are closed at this time, the gap or opening 165 between the assemblies 47—47 exists which permits insertion of the fiber cutter blade 162 therebetween (FIG. 15).

The fiber cutter 161 is then actuated to fracture the portion of the fiber 31 extending across the gap 165 between the two storage and clamping assemblies 47—47. The clutch 107 on the locking jack shaft 111 is deactivated at this time permitting both of the spool drive motors 106—106 to assume their normal independent but electrically controlled functions.

In order to unload the spool 42 on which the fiber 31 was wound, the associated spool spindle arm 83 is oscillated upward approximately 120° to the unloading position, and at the same time switch actuator 125 moves out of contact with the switch 126 and the drive motor 106 is de-energized and the full spool 42 allowed to coast or be braked to a stop.

At this time the air cylinder 90 connected to the storage and clamping assembly 47 associated with the full spool 42 can be actuated which opens the slot 60 in the assembly 47 and frees the inside end of the fiber 31 wound therein. The inside end of the fiber 31 is unwound from the slot 60 in the assembly 47 and wound on the full spool 42.

The air cylinder 90 of the storage and clamping assembly 47 associated with the full spool 42 is deactivated which again allows the slot 60 in the assembly 47 to close. The full spool 42 and the associated assembly 47 is removed from the spindle by manually moving the two tabs 76—76 of the spindle latches 67—67 apart. The storage and clamping assembly 47 is then separated from the full spool 42 and and empty spool 42 is positioned onto the associated storage and clamping assembly 47.

The empty spool 42 and the associated storage and clamping assembly 47 is then placed onto the drive spindle 70, with the drive lugs 65—65 projecting between the ribs 48—48 of the spool, and pushed onto the drive spindle 70 until the latches 67—67 of the associated storage and clamping assembly 47 engage the annular groove 73 in the drive spindle 70 and the drive lug 80 on the flange 85 of the spindle 70 extends between two of the ribs 48—48 in the spool 42. A spring washer (not shown) on the drive hub 82 of the spindle 70 removes any looseness between the spool 42 and the associated storage and clamping assembly 47.

The spindle 70 associated with the empty spool 42 is oscillated downwardly to the take-up position, actuating switch 126, and the peripheral velocity of the empty spool 42 is accelerated by the associated drive motor 106 to match the line speed of fiber drawing operation. This empty spool 42 is now ready to accept a transfer of distribution of the fiber 31 from the then active spool 42 on which the fiber 31 has been packaged since the previous transfer of distribution of the fiber 31, and the sequence of operations are repeated.

It is to be understood that the above-described arrangements are simply illustrative of the invention. Other arrangements may be devised by those skilled in the art which will embody the principles of the invention and fall within the spirit and scope thereof.

What is claimed is:

1. A method of winding strand such as optical fiber continuously at relatively high speeds onto alternate spools, said method comprising the steps of:
   rotating the spools and associated strand storage and clamping assemblies positioned closely adjacent to each of the spools;
   distributing the strand on alternate ones of the spools;
   causing distribution of the strand to be transferred alternating from one of the spools to the other; and
   engaging a portion of the strand being fed to one of the spools with a moveable member which spans across peripheral portions of the storage and clamping assemblies and holding the portion of the strand in clamped engagement with the peripheral portions of the storage and clamping assemblies each time the distribution of the strand is transferred from one of the spools to the other to facilitate the transfer of the strand into the storage and clamping assembly associated with the other spool and each time the distibution of the strand is transferred from the storage and clamping assembly associated with the other spool to the other spool.

2. A method of winding strand such as optical fiber continuously at relatively high speeds onto alternate spool means, said method comprising the steps of:

rotating an empty spool means with drive means including a drive motor and an active spool means on which optical fiber is wound with drive means including a drive motor separate from the drive means used to rotate the empty spool means;

distributing the strand on alternate ones of the spool means, the distributing being accomplished on an active spool means with an empty spool means positioned adjacent to the active spool means;

causing distribution of the strand to move alternately from the active spool means to the empty spool means; and physically locking the drive means for rotating the active spool means to the drive means for rotating the empty spool means to match the angular rotational velocities of both spool means during transfer of the distribution of the strand from the active sool means to the empty spool means to prevent excessive variation in stresses in the strand during the transfer of the distribution of the strand from the active spool means to the empty spool means.

* * * * *